United States Patent Office 2,886,486
Patented May 12, 1959

2,886,486

METHOD OF IMPREGNATING WOOD WITH A CHROMATED ZINC SULFATE COMPOSITION AND PRODUCT THEREWITH

Harlan A. Depew, Glendale, Mo., assignor to American Zinc, Lead & Smelting Company, St. Louis, Mo., a corporation of Maine No Drawing. Application July 20, 1955
Serial No. 523,385

3 Claims. (Cl. 167—38.5)

This invention relates to wood preservation.

Zinc chloride has for many years been recognized as a wood preservative, rendering the wood resistant to fungi, termites, and other wood destroying lower forms of life, and making it fire resistant. Its popularity is reflected in the treatment of cross ties, for which purpose almost fifty million pounds of zinc chloride were used in 1920. However, the use of zinc chloride has steadily declined, to the point that in 1940 about one million, two hundred and twenty thousand pounds of zinc chloride was used for this purpose. The decrease in the use of zinc chloride over the years was due in large measure to the fact that zinc chloride is water-soluble, so that it is leached out of wood which is exposed to the weather, and the protection that it affords is therefore lost.

Zinc chloride is also corrosive to treating cylinders and to reduce its corrosive effect, dichromates have been added to the zinc chloride solution. Something over two and one-half million pounds of chromated zinc chloride are used each year in the treatment of cross ties.

While chromated zinc chloride is less corrosive than zinc chloride, it still suffers from a number of disadvantages. It is somewhat corrosive to treating cylinders, tanks, pipe lines, valves and other components of the treating equipment. It is corrosive to nails or other metal objects which may come in contact with the treated wood. It has a somewhat deleterious effect on paint which is applied to the treated wood. It is water-soluble, and it gives to the wood a dark reddish color. It also tends to deteriorate the wood.

The use of zinc sulfate in place of zinc chloride has been tried in times past, but its use has been largely abandoned, no advantage having been found for it over the use of zinc chloride.

One of the objects of this invention is to provide a method of treating wood which produces a clean, paintable surface, which may be carried out with less corrosive effect on the treating equipment than treatment with zinc chloride or chromated zinc chloride, and which produces wood which is less corrosive to metal and more permanently fire and fungi resistant than wood treated with zinc chloride or chromated zinc chloride.

Another object of this invention is to provide an improved treating solution with which the treated wood may be impregnated.

Another object of this invention is to provide a treated wood which is less corrosive to nails and the like, less liable to deterioration, less discolored, more permanently fire and fungi resistant and better adapted to hold paint than wood treated with chromated zinc chloride.

Other objects will become apparent to those skilled in the art in the light of the following description.

In accordance with this invention generally stated, wood is impregnated with chromated zinc sulfate.

I have found that chromated zinc sulfate produces unexpectedly superior results in the treatment of wood, over the results produced with chromated zinc chloride, zinc chloride or zinc sulfate.

I have found that a water solution of chromated zinc sulfate is less corrosive to treating equipment than is a solution of chromated zinc chloride. Wood impregnated with chromated zinc sulfate is less corrosive to nails and other metal objects than chromated zinc chloride. Wood treated with chromated zinc sulfate holds paint comparably with untreated wood, and far better than wood treated with chromated zinc chloride or with zinc chloride. I have found that chromated zinc sulfate is less destructive of the treated wood than zinc chloride or chromated zinc chloride; that it leaches from the treated wood substantially less than chromated zinc chloride; and that it causes little discoloration of the wood.

The cost of chromated zinc sulfate is comparable with that of chromated zinc chloride. The same amount of dichromate, which may be in any suitable form, such as sodium, potassium or ammonium dichromate, is required. The zinc chloride is more expensive per pound, but the number of pounds of zinc sulfate required to provide a given amount of zinc is correspondingly greater.

The wood may be treated with chromated zinc sulfate in exactly the same way as it is presently treated with chromated zinc chloride. The concentration of the chromated zinc sulfate solution is preferably such as to ensure the impregnation of the wood with around one-half to one and one-half pounds per cubic foot of zinc, calculated as zinc oxide, although the amount may be varied as desired.

An illustrative example of a suitable treating solution is as follows:

| | Percent |
|---|---|
| Sodium dichromate dihydrate | 1.6 |
| Zinc sulfate monohydrate | 6.4 |
| Water | 92.0 |
| | 100.0 |

Impregnation with this solution in the usual treating cylinder will produce an impregnation of about one-half to three-fourth pounds of zinc, calculated as zinc oxide, per cubic foot of wood.

Having thus described the invention, what is claimed and desired to be secured by Letters Patent is:

1. The method of preserving wood comprising impregnating the wood with chromated zinc sulfate.

2. As an improved article of manufacture, wood impregnated with chromated zinc sulfate in an amount of zinc, calculated as zinc oxide, between about ½ and about 1½ lbs. per cubic foot of wood.

3. A wood treating solution consisting essentially of chromated zinc sulfate and water.

References Cited in the file of this patent

UNITED STATES PATENTS

| 2,149,332 | Boller | Mar. 7, 1939 |
| 2,408,978 | Hager | Oct. 8, 1946 |

OTHER REFERENCES

Frear: "Chem. of Insecticides, Fungicides and Herbicides," 2nd ed., 1948, D. Van Nostrand, N.Y.C., pp. 255–256.

Van Groenou et al.: "Wood Preservation During the Last 50 Years," A. W. Sijthoff, Leiden (Holland), 1951, pp. 125–128 and 223.